United States Patent [19]
Miyakoshi et al.

[11] 4,322,088
[45] Mar. 30, 1982

[54] REAR WHEEL SUSPENSION FOR A MOTORCYCLE

[75] Inventors: Shinichi Miyakoshi, Fujimi; Kazuhiro Yamamoto, Asaka, both of Japan

[73] Assignee: Honda Giken Kogyo Kabushiki Kaisha, Tokyo, Japan

[21] Appl. No.: 119,485

[22] Filed: Feb. 7, 1980

[30] Foreign Application Priority Data

Feb. 13, 1979 [JP] Japan ............................ 54-16827[U]

[51] Int. Cl.³ ............................................. B62K 25/04
[52] U.S. Cl. ..................................... 280/284; 180/227
[58] Field of Search ................. 180/227; 280/284, 285

[56] References Cited
U.S. PATENT DOCUMENTS

| | | | |
|---|---|---|---|
| 3,907,332 | 9/1975 | Richardson | 267/15 X |
| 3,977,697 | 8/1976 | MacPike | 280/284 |
| 4,058,181 | 11/1977 | Buell | 180/227 |

Primary Examiner—John P. Silverstrim
Attorney, Agent, or Firm—Armstrong, Nikaido, Marmelstein & Kubovcik

[57] ABSTRACT

An improved rear wheel suspension for a motorcycle is provided which includes a body frame, a rear wheel support frame such as a rear fork pivotally mounted on the body frame for upward and downward movement relative thereto and rotatably supporting a rear wheel, at least one rear shock absorber disposed between the body frame and the rear wheel support frame for damping the relative movement between the body frame and the rear wheel, and a mechanism for adjusting the damping force of the rear shock absorber in a manner such that the rate of increase in the compression stroke of the rear shock absorber is increased in proportion to the upward movement of the rear wheel relative to the body frame.

3 Claims, 8 Drawing Figures

REAR WHEEL SUSPENSION FOR A MOTORCYCLE

BACKGROUND OF THE INVENTION

1. Field of the Invention

This invention relates to a rear wheel suspension for a motorcycle adapted to effectively absorb shock imposed on a rear wheel for improved riding comfort even with variation in load on the motorcycle.

2. Description of the Prior Art

In the past, there has been known a rear wheel suspension for a motorcycle in which a rear wheel support frame such as a rear fork supporting a rear wheel is mounted on the body frame at the rear portion thereof for up and down swinging movement and in which a rear shock absorber is connected between the body frame and the rear wheel support frame. However, such a prior art rear wheel suspension is disadvantageous in that the greater the load on the motorcycle, the worse becomes the riding comfort.

SUMMARY OF THE INVENTION

The present invention is intended to obviate the above disadvantage and has for its object the provision of an improved rear wheel suspension of the kind described which is capable of improving the riding comfort and running performance of the motorcycle by increasing the rate of increase in compression stroke of the rear wheel shock absorber in proportion to the increasing upward displacement of the rear wheel relative to the body frame to thereby enable the rear shock absorber to absorb the greater amount of shock in an effective manner.

Another object of the invention is to provide a rear wheel suspension of the kind described in which the rate of increase in compression stroke of the rear shock absorber can be readily adjusted to a desired value.

A further object of the invention is to provide a rear wheel suspension of the kind described which is small in size and adapted for installation in a limited available space, light in weight, excellent in durability and can perform the intended function for long periods of use.

The above and other objects, features and advantages of the invention will become apparent from the following detailed description of the invention when taken in conjunction with the accompanying drawings which illustrate several presently preferred embodiments of the invention.

BRIEF DESCRIPTION OF THE DRAWINGS

FIG. 1 is a side view of a motorcycle equipped with a rear wheel suspension constructed according to the invention;

FIG. 2 is an enlarged view of the essential parts of the suspension of FIG. 1, showing its operating state;

FIG. 3 is a side view of a motorcycle equipped with a modified form of rear wheel suspension according to the invention;

FIG. 4 is a partial view of the suspension as taken from the line IV—IV of FIG. 3;

FIG. 6 is a side view of a motorcycle equipped with another form of rear wheel suspension according to the invention;

FIG. 7 is an enlarged view of the essential parts of the suspension of FIG. 6, showing its operating state.

DESCRIPTION OF THE PREFERRED EMBODIMENTS

Figure 1:
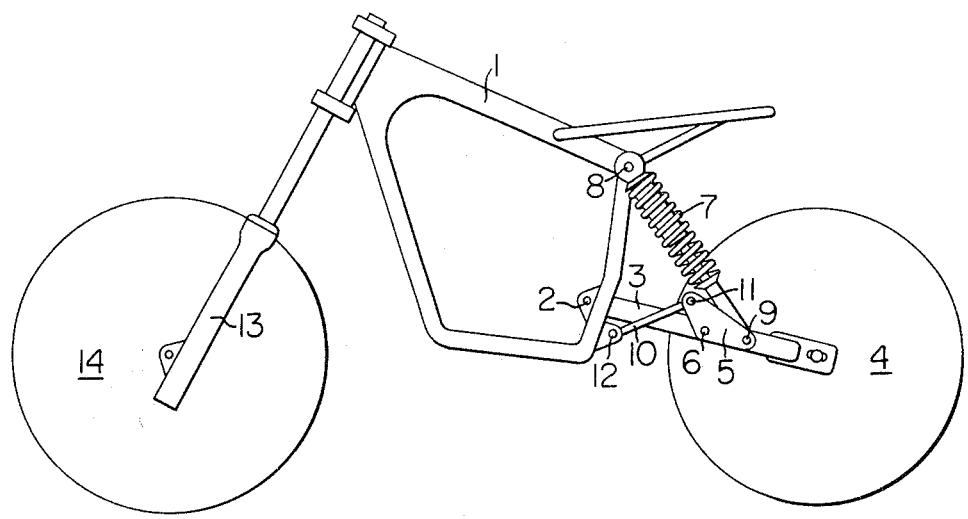
FIGS. 1 and 2 illustrate a preferred embodiment of the present invention.

In the following, same reference numerals are given to the similar or corresponding elements throughout the several embodiments of the invention.

A first embodiment of the invention will now be described with reference to FIGS. 1 and 2.

Reference numeral 1 indicates a body frame of a motorcycle, to the rear portion of which is pivotally connected at 2 a rear wheel support frame or a rear fork 3 at the forward end thereof for relative upward and downward swinging motion. The rear fork 3 has a pair of side fork sections between which a rear wheel 4 is rotatably supported.

Rotatably mounted at 6 on the respective side fork sections of the rear fork 3 are a pair of lever plates 5 each in the form of a inverted triangle at their intermediate corners, each of which lever plates has a first or rear arm pivoted at 9 to a rear shock absorber 7 and a second or forward arm pivoted to a pull rod 10 at a pivot point 11 lying above the pivot connection 9. The shock absorbers 7 extend forwardly and upwardly from the lever plates 5 and pivotally connected at 8 to the opposite sides of the rear upper portion of the body frame 1. The pull rods 10 extend forwardly and downwardly from the pivot connection 11 and are pivotally connected at 12 to the rear lower portion of the frame 1.

Turnably mounted on the body frame 1 at its forward end is a front fork 13 which rotatably supports a front wheel 14.

Figure 2:
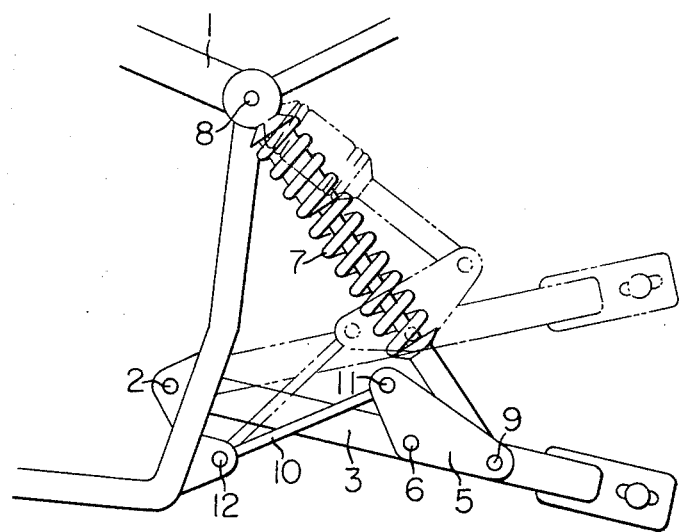

FIG. 2 shows the operating relationship between the rear fork 3, the rear shock absorbers 7, the lever plates 5, and the pull rods 10, taken when the rear wheel 4 swings up and down with respect to the body frame 1. When the rear wheel 4 is caused to move up and down relative to the body frame 1 during travel of the motorcycle, the rear fork 3 is swung upwardly and downwardly around the pivot point 2 so that the shock absorbers 7 contract and expand to absorb impactive loads to be transmitted to the body frame 1, as detailed later with reference to FIG. 2.

As the rear fork 3 is swung upwardly from the solid line position (lower position) to the chain-dotted line position (upper position), the inverted triangular-shaped lever plates 5, pivoted to the intermediate portions of the opposite side sections of the rear fork 3, are moved upwardly along with the rear fork 3 so that the forward arms of the lever plates 5, pivoted at 11 to the pull rods 10, are gradually pulled forward in accordance with the upward movement of the lever plates 5 to rotate the latter around the pivot points 6 in the counterclockwise direction. As a result, the amount of contraction of the rear shock absorbers 7, pivoted at 9 to the rear arms of the lever plates 5, is equal to the sum of the amount of movement of the pivot connection 9 due to the upward movement of the rear fork 3, and the amount of rotation of the pivot connection 9 due to the counterclockwise rotation of the lever plates 5. As the rate of displacement of each of the pivot connections 9 in the direction of the axis of each shock absorber 7 due to the rotation of the lever plates 5 increases in proportion to the upward movement of the rear fork 3, the rate of increase in contraction of the shock absorbers 7 is increased in accordance with the upward movement of the rear wheel 4. This is graphically illustrated in FIG. 5 in which reference characters L and δ represent the upward displacement of the rear wheel 4 and the amount of contraction of the shock absorbers 7, respectively. As apparent from this Figure, the contraction characteristic of the rear shock absorbers 7 is shown by a parabolic curve. This means that as the amount of the upward movement of the rear wheel 4 is made greater due to the increase in loads imposed on the body frame 1 and/or due to the increase of external forces acting from the road surface on the rear wheel 4, the amount of contraction of the rear shock absorbers 7 is accordingly increased to render their damping characteristic harder so that the greater quantity of impactive forces exerted on the rear wheel 4 can be absorbed effectively to thereby improve the riding comfort and running performance to a substantial extent irrespective of variations in load on the body frame 1. In this case, during contracting movement of the rear shock absorbers 7, the pull rods 10 are subjected only to tensile forces but not to twisting or bending forces and therefore can be constructed to have a relatively small cross section with a strength enough to withstand the tensile forces acting thereon.

Figure 3:
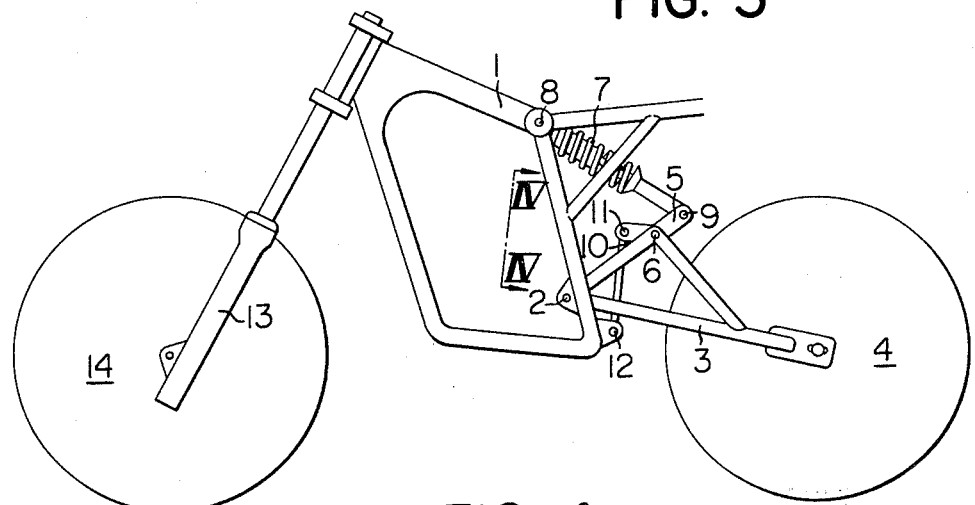
FIGS. 3 and 4 illustrate another embodiment of the invention.
Figure 4:
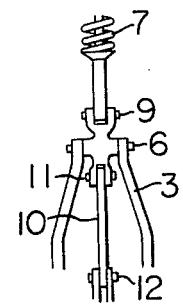

FIGS. 3 and 4 represent a second embodiment of the invention, in which a rear wheel support frame such as a rear fork 3 includes a pair of side fork members each in the form of a triangle. A bellcrank-shaped lever 5 is rotatably mounted at 6 on the triangular side fork members of the rear fork 3 at their top corners and has a forward arm pivoted at 11 to a pull rod 10, which is pivotally connected at 12 to the body frame 1, and a rear arm pivoted at 9 to the rear end of a single shock absorber 7 which is arranged on a vertical plane passing through the central longitudinal axis of the body frame 1 and which is pivotally connected at 8 to the rear upper portion of the body frame 1. The operation of this embodiment is the same as that of the aforementioned first embodiment. Namely, as the rear fork 3 swings upwardly around the pivot connection 2, the lever 5 is caused to rotate in a counterclockwise direction relative to the rear fork 3 under the action of the pull rod 10 whereby the amount of movement of the pivot connection 9 is equal to the sum of the upward displacement of the rear fork 3 and the amount of rotation of the lever 5.

Figure 6:
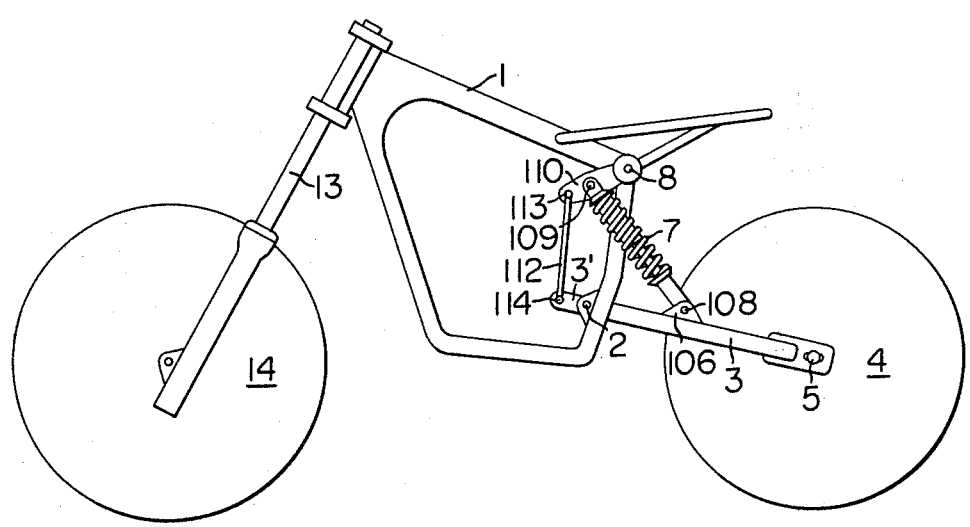
FIGS. 6 and 7 illustrate a further embodiment of the invention.
Figure 7:
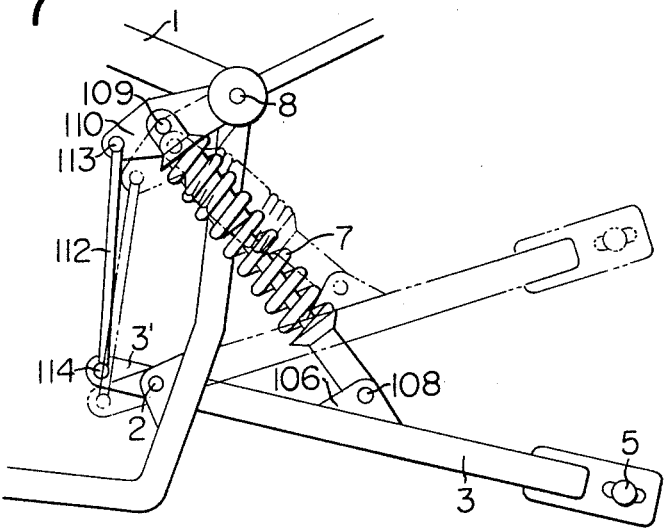

FIGS. 6 and 7 show a third embodiment of the invention. In this embodiment, a rear fork 3 supporting a rear wheel 4 is rotatably mounted at its forward end on the rear lower portion of the body frame 1 by means of a pivot connection 2 and has a forward extension 3' formed integrally therewith and projecting forwardly from the forward end thereof.

A pair of shock absorbers 7 are pivotally connected at their lower end with the opposite side sections of the rear fork 3 at the intermediate portions thereof and extend forwardly and upwardly therefrom so as to be pivotally connected at their upper ends with a lever plate 110 at its middle, which is pivotally mounted at 8 on the rear upper portion of the body frame 1 and extends forwardly and downwardly therefrom so as to be pivotally connected at 113 with a pull rod 112 which in turn is pivoted at 114 to the extension 3' of the rear fork 3.

FIG. 7 illustrates the operating relationship between the rear fork 3, the shock absorbers 7, the lever plate 110 and the pull rod 112, as taken when the rear wheel 4 swings up and down relative to the body frame 1. When the rear wheel 4 is caused to move upwardly and downwardly relative to the body frame 1 during travel of the motorcycle, the rear fork 3 is swung up and down around the pivot point 2 to absorb impactive forces transmitted to the body frame 1 by expansion and contraction of the rear shock absorbers 7 in the manner as described below in detail.

Figure 5:
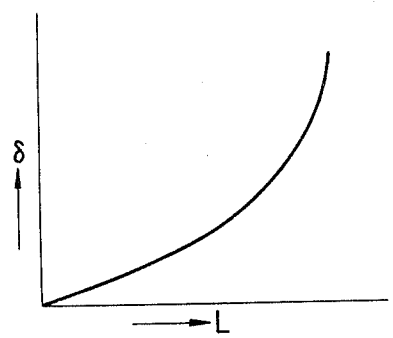
FIG. 5 is a graphic representation showing the relationship between the displacement of a rear wheel and the compression stroke of the rear shock absorber.

When the rear fork 3 swings upwardly from the solid line position (lower position) to the chain-dotted line position (upper position), as shown in FIG. 7, the rear shock absorbers 7, pivotally connected to the opposite side sections of the rear fork 3, are compressed and at the same time the extension 3' of the rear fork 3 is rotated counterclockwise about the pivot point 2 to a lower position so that the pull rod 112, pivoted at 114 to the extension 3' of the rear fork 3, is pulled downwardly to swing the lever plate 110 downwardly in a counterclockwise direction about the pivot connection 8 to further compress the shock absorbers 7. As a result, the amount of compression or contraction of the rear shock absorbers 7 becomes equal to the sum of the amount of displacement of the pivot connection 108 due to the upward swing of the rear fork 3 and the amount of displacement of the pivot connection 109 due to the downward swing of the lever plate 110, whereby the amount of contraction of the rear shock absorbers 7 is increased in propotion to the upward movement of the rear wheel 4 while at the same time the rate of increase in contraction of the shock absorbers 7 is increased in accordance with the increasing upward displacement of the rear fork 3. In this case, the relationship between the amount of contraction of the shock absorbers 7 and the upward displacement L of the rear wheel 4 is the same as shown in FIG. 5. Thus, the contraction characteristic of the rear shock absorbers 7 according to this embodiment exhibits a parabolic curve.

In this connection, it is to be noted that the shock absorbers 7 may be pivotally connected at 113 instead of 109 to the lever plate 110, the pull rod 112 being pivoted at 109 instead of 113 to the lever plate 110. This arrangement operates substantially in the same manner as does the arrangement shown in FIGS. 6 and 7.

Figure 8:
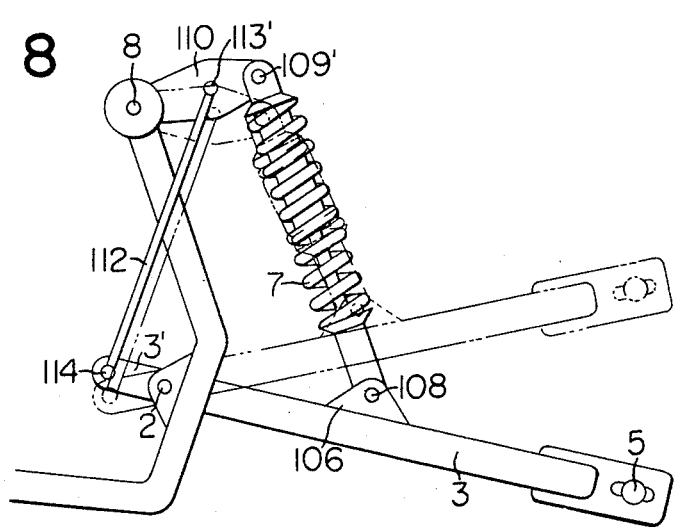
FIG. 8 illustrates a further modified form of rear wheel suspension according to the invention, showing the same operating state as FIG. 7.

FIG. 8 illustrates a modification of the third embodiment as shown in FIGS. 6 and 7. In this modification, a lever plate 110 is pivotally mounted at 8 on the rear upper portion of the body frame 1 and extends rearwardly therefrom for pivotal connection at 109' with the upper ends of a pair of rear shock absorbers 7 which are in turn pivotally connected at 108 to the opposite side sections of a rear fork 3. A pull rod 112 pivoted at 114 to an extension 3' of the rear fork 3 is pivotally connected at 113' to the middle portion of the lever plate 110. The operation of this modification is the same as that of the aforementioned third embodiment as shown in FIGS. 6 and 7. Namely, as shown in FIG. 8 in the chain-dotted line, when the rear fork 3 is swung upwardly around the pivot connection 2, the lever plate 110 is pulled downwardly to rotate in a clockwise direction around the pivot point 8 by the action of the pull rod 112 whereby the rear shock absorbers 7 are compressed by means of both the downward movement of the lever plate 110 and the upward swing of the rear fork 3.

It is possible to arrange the shock absorbers 7 and the pull rod 112 in a manner such that the shock absorbers 7 are pivotally connected at 113' instead of 109' to the lever plate 110 and the pull rod 112 is pivoted at 109' instead of 113' to the lever plate 110 with substantially the same operation as in the arrangement of FIG. 8.

In the embodiments as illustrated in FIGS. 6 to 8, a pair of shock absorbers are employed but a single shock absorber may be used satisfactorily as in the case of the FIG. 3 embodiment.

In the foregoing description, though the rear fork 3 is used as the rear wheel support frame, a swing arm of cantilever type may be used in place thereof which acts to support the rear wheel only at one side of the body frame.

To summarize, according to the present invention, lever plate means is arranged such that it is rotated relative to a rear wheel support frame in accordance with the upward swing of the latter to impart a compressive force to rear shock absorber means disposed between the body frame and the rear wheel support frame, as a consequence of which it becomes possible to set the rate of increase in the compression stroke of the shock absorber means at any desired value in a simple and easy way, thus improving the riding comfort and running performance of the motorcycle irrespective of the variation of loads carried thereon.

Further, since pull rod means, serving to impart torque to the lever plate, is subjected only to a tensile force but not to twisting, bending or like other undersirable forces and hence can be formed of a relatively small rod having a limited cross sectional area, which, in combination with the lever plate means formed in a reduced size, makes it possible to fabricate the entire device in a very compact and light-weighted manner adapted for installation thereof in a limited space without increasing the total weight of the motorcycle.

Moreover, the triangular-shaped construction of the lever plate means serves to inhance the strength thereof, improving, in cooperation with the fact that the pull rod means is acted upon only by a tensile force, the durability of the device as a whole.

While several presently preferred embodiments of the invention have been shown and described, it will be evident to those skilled in the art that various changes or modifications may be made therein without departing from the spirit or scope of the invention as defined in the appended claims.

What is claimed is:

1. A rear wheel suspension for a motorcycle comprising a body frame, a rear wheel support frame pivotally mounted on said body frame for upward and downward movement relative thereto and rotatably supporting a rear wheel, rear shock absorber means disposed between said body frame and said rear wheel support frame for damping the relative movement between said body frame and said rear wheel, means for adjusting the damping force of said shock absorber means in a manner such that the rate of increase in the compression stroke of the shock absorber means is increased in proportion to the upward movement of said rear wheel relative to said body frame, said means for adjusting the damping force of said shock absorber means comprises lever plate means pivotally mounted on a rear upper portion of said body frame, an extension formed integral with said rear wheel support frame and projecting forwardly therefrom beyond the pivot connection thereof with the body frame, pull rod means pivoted at its one end to said lever plate means and at its other end to said extension, said rear shock absorber means being pivotally connected at its one end to said lever plate means and at its other end to said rear wheel support frame at its intermediate portion.

2. A rear wheel suspension for a motorcycle as set forth in claim 1, wherein said lever plate means is pivotally mounted at its rear end on the rear upper portion of said body frame and extends forwardly therefrom for pivot connection at its forward end to said pull rod means, and said shock absorber means is pivotally connected to an intermediate portion of said lever plate means lying between said forward and rear ends.

3. A rear wheel suspension for a motorcycle as set forth in claim 1, wherein said lever plate means is pivotally mounted at its forward end on the rear upper portion of said body frame and extends rearwardly therefrom for pivot connection at its rear end to said rear shock absorber means, and said pull rod means is pivoted to an intermediate portion of said lever plate means lying between said forward and rear ends.

* * * * *